Sept. 21, 1943.   C. K. HUTHSING   2,329,836
FIRE HOSE
Filed Aug. 4, 1941
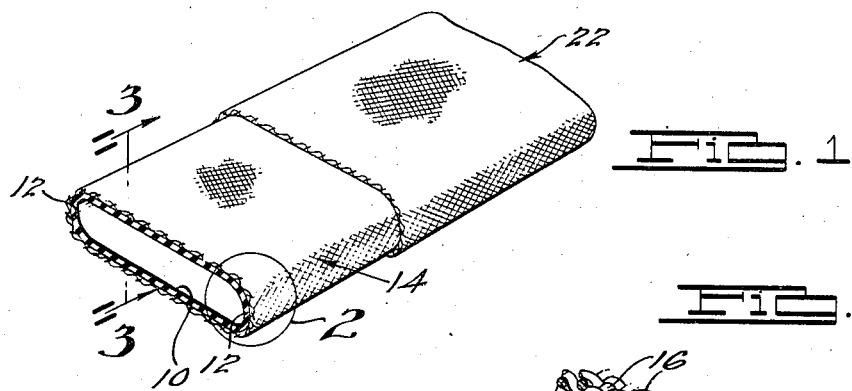
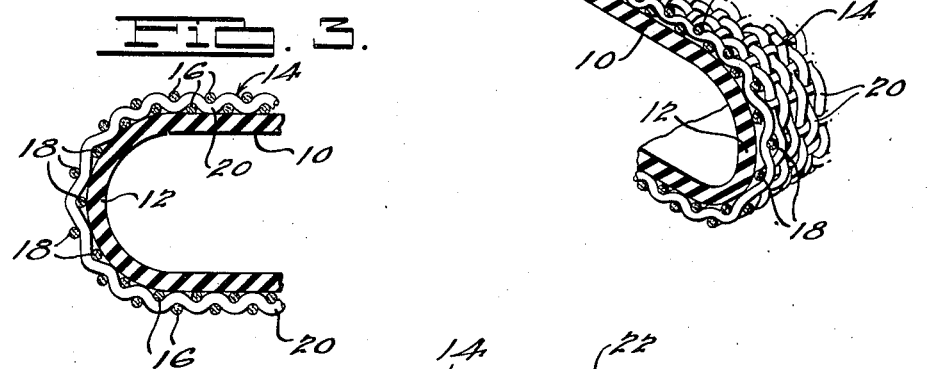
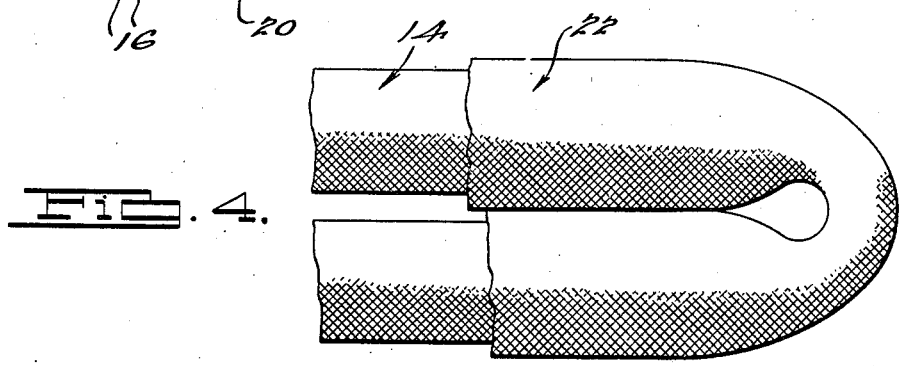
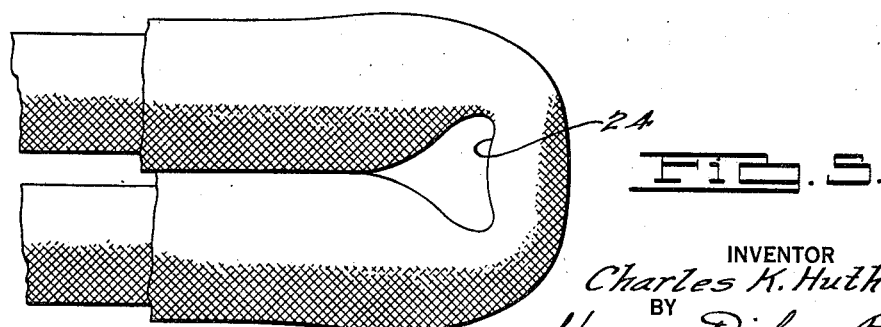
INVENTOR
Charles K. Huthsing
BY
Harness, Dickey & Pierce.
ATTORNEYS.

Patented Sept. 21, 1943

2,329,836

UNITED STATES PATENT OFFICE 2,329,836

FIRE HOSE

Charles K. Huthsing, Grosse Pointe, Mich.

Application August 4, 1941, Serial No. 405,286

2 Claims. (Cl. 138—53)

The present invention relates to hose structure, and particularly to improvements in fire hose structure, such as that carried on fire trucks.

One of the primary objects of the present invention is to provide improved fire hose which is less burdensome to handle; will occupy less space when folded for storage and will have a longer life than prior hose structures.

Another object of the invention is to provide improvements in hose of the type mentioned which is pliable and flexible at the areas of fold, so that it may be easily folded without pinching or straining the rubber at such areas, thereby insuring long life for the hose.

A further object of the invention is to provide improvements in the inner jacket of the hose in that the outside edges of the jacket are so constructed that the rubber tube is not pinched by folding or rolling the hose.

Other objects of the invention will become apparent from the following specification, the drawing relating thereto, and from the claims hereinafter set forth.

In the drawing, in which like numerals are used to designate like parts in the several views throughout:

Figure 1 is a fragmentary, perspective view of a section of fire hose according to the present invention;

Fig. 2 is an enlarged perspective view of the structure within the circle 2 of Fig. 1;

Fig. 3 is an enlarged, fragmentary, cross-sectional view taken in the direction of the line 3—3 of Fig. 1;

Fig. 4 is a side elevational view of a section of hose according to the present invention illustrating the form that the hose takes when bent; and Fig. 5 is a view similar to Fig. 4 of a prior hose structure illustrating the form that such hose takes at the bend when folded.

It will be appreciated that fire hose must be of a rugged character in that it is subjected to hard wear. Ordinarily, such hose is carried on racks mounted on trucks and, when so carried, is folded back and forth upon itself so that a substantial length of hose may be stored within a relatively small space. Such hose spends approximately ninety-six per cent (96%) of its life in its folded position. There is, therefore, a substantial strain placed upon the hose at the bends, and in prior structures the construction of the jacket has been such that the rubber inner tube of the hose is pinched and strained so that failure of the rubber lining results.

According to the present invention, a construction is provided in which the tube is not pinched or strained at the folds, so that the life of the hose is considerably increased.

Referring to the drawing, and referring particularly to Figs. 1 through 4 thereof, a hose according to the present invention is illustrated which comprises an inner tubular member 10 formed of a flexible, impervious material, such as rubber. Such tubular member 10 is preformed so that it has substantially flat side walls with rounded, outer edges 12. The hose 10 is flat-cured with a woven jacket generally indicated at 14 disposed completely therearound. Such jacket 14 is woven with warp strands 16 and 18 and woof strands 20. The jacket 14 is generally complementary in shape to the shape of the tube 10, so that it firmly embraces and supports such rubber tube 10. The strands 20 may be in the form of a continuous spiral interwoven with respect to the strands 16 and 18 and so disposed that the strands 20 extend around the tube 10 in closely adjacent and uniformly spaced relationship with respect to each other. The strands 20 are of greater diameter than the strands 16 and 18 in that such strands 20 carry the pressure load on the hose and prevent the bursting of the tube 10.

The jacket 14 is so positioned on the tube 10 that the strands 16 and 18 extend longitudinally of the tube and the strands 20 extend therearound, with the strands 16 disposed on the flat sides of the flexible rubber member 10 and the strands 18 disposed on the rounded outer edges 12. The strands 16 are uniformly disposed with respect to each other so that adjacent strands lie close to each other. The adjacent strands 18 are so disposed that such strands are spaced from each other a greater distance than the adjacent strands 16. In the embodiment illustrated, such strands 18 are spaced approximately twice as far apart as the strands 16.

An outer woven jacket generally indicated at 22 is adapted to embrace the inner jacket 14. Such outer jacket 22 may be formed either similar to the jacket 14 and correspondingly positioned, or such outer jacket 22 may be formed with all of the strands uniformly spaced from each other.

When the hose is folded, as shown in Fig. 4, the contour of the hose at the bend is substantially that illustrated. Due to the spacing of the strands 18 at the side edges of the hose 10, such hose is not pinched or crimped and follows a smooth bend without any injury to the rubber tube at the bends.

In Fig. 5, a prior art hose is illustrated in which the inner jacket is not formed as taught above but, on the other hand, is formed with the longitudinal strands uniformly spaced with respect to each other completely around the hose, including the side edges thereof. When such hose is bent, the shape of the bend is indicated at 24 and is of such a character that the side edges of the rubber inner tube at the bend are pinched and strained so that failure of the hose results.

Formal changes may be made in the specific embodiment of the invention described without departing from the spirit and substance of the invention, the scope of which is commensurate with the appended claims.

What is claimed is:

1. In a hose structure, an inner member formed of an impervious, flexible material, a woven jacket surrounding said member, said jacket being formed of annular strands and longitudinally extending strands interwoven with respect to said annular strands, said longitudinally extending strands being spaced farther apart from adjacent strands by a distance substantially equal to a width of a strand in limited regions at opposite sides of said hose than at points intermediate such regions.

2. In a hose structure, an inner tubular member formed of rubber, said member having substantially flat side walls interconnected by rounded edges, a woven jacket embracing said member, said jacket being formed of annular strands and longitudinally extending strands interwoven with respect to said annular strands, said longitudinally extending strands being spaced farther apart from adjacent strands substantially equal to a width of a strand at said rounded edges than at said flat side walls.

CHARLES K. HUTHSING.